US012654885B2

(12) United States Patent
    Kopysc

(10) Patent No.:  US 12,654,885 B2
(45) Date of Patent:      Jun. 16, 2026

(54) METHOD OF PRODUCING AN ALUMINOSILICATE REINFORCED SILICONE SYNTACTIC THERMAL PROTECTION SYSTEM

(71) Applicant: Blue Origin Manufacturing, LLC, Huntsville, AL (US)

(72) Inventor: Adam Kopysc, Renton, WA (US)

(73) Assignee: Blue Origin Manufacturing, LLC, Huntsville, AL (US)

( * ) Notice:  Subject to any disclaimer, the term of this patent is extended or adjusted under 35 U.S.C. 154(b) by 181 days.

(21) Appl. No.: 18/461,209

(22) Filed:  Sep. 5, 2023

(65)  Prior Publication Data

US 2025/0074628 A1  Mar. 6, 2025

(51) Int. Cl.
    *B64G 1/58*     (2006.01)
    *C08J 9/00*     (2006.01)
    *C08J 9/32*     (2006.01)
    *C08K 3/34*     (2006.01)
    *C08K 7/26*     (2006.01)
            (Continued)

(52) U.S. Cl.
    CPC .............. *B64G 1/58* (2013.01); *C08J 9/0071* (2013.01); *C08J 9/32* (2013.01); *C08K 3/34* (2013.01); *C08K 3/346* (2013.01); *C08K 7/26* (2013.01); *C08K 9/06* (2013.01); *C08L 83/04* (2013.01); *C08J 2203/22* (2013.01); *C08J 2383/04* (2013.01); *C08K 2201/011* (2013.01)

(58) Field of Classification Search
    CPC ...................................................... B64G 1/58
    See application file for complete search history.

(56)  References Cited

U.S. PATENT DOCUMENTS

| | | | |
|---|---|---|---|
| 4,456,208 | A | 6/1984 | Macconochie et al. |
| 4,713,275 | A | 12/1987 | Riccitiello et al. |
| 6,293,496 | B1 | 9/2001 | Moe |

(Continued)

OTHER PUBLICATIONS

Yuan, Peng, et al. "Functionalization of halloysite clay nanotubes by grafting with Î³-aminopropyltriethoxysilane." The Journal of Physical Chemistry C 112.40 (Sep. 12, 2008): 15742-15751. (Year: 2008).*

(Continued)

*Primary Examiner* — Benjamin A Schiffman
(74) *Attorney, Agent, or Firm* — Summit Patents, PC

(57)  ABSTRACT

Techniques and systems are used to fabricate a thermal protection systems (TPS) for placement on various parts of a structure, such as a spacecraft. The TPS may comprise syntactic foam as a spray-on foam insulation (SOFI), which may be sprayed onto a surface. Alternatively, the TPS may comprise syntactic foam that is applied as preformed panels that are adhered or mechanically attached to a surface. Performance of a syntactic foam may be improved by including an aluminosilicate nanotube material, such as halloysite nanotubes, in a matrix material. The halloysite nanotubes may be hydrated and treated with a silane couplant before being mixed into the matrix material, which may be a two-part silicone based syntactic insulator material, for example. The halloysite nanotubes, in addition to acting as a filler and reinforcement for the syntactic insulator material, release water during oblation, thus contributing to the effectiveness of a TPS.

20 Claims, 3 Drawing Sheets

400

(51) Int. Cl.
    *C08K 9/06*         (2006.01)
    *C08L 83/04*       (2006.01)

(56)         References Cited

U.S. PATENT DOCUMENTS

| | | | | |
|---|---|---|---|---|
| 7,888,419 | B2 * | 2/2011 | Cooper | C08K 9/04 |
| | | | | 524/451 |
| 8,147,943 | B1 | 4/2012 | Byrd et al. | |
| 8,648,132 | B2 * | 2/2014 | Fleischer | B82Y 30/00 |
| | | | | 523/351 |
| 10,259,972 | B2 * | 4/2019 | Fish | C08L 83/16 |
| 11,459,247 | B2 * | 10/2022 | Almasri | B01J 20/28007 |
| 11,505,684 | B2 * | 11/2022 | Dai | C08L 9/00 |
| 11,667,408 | B2 * | 6/2023 | Brendel | F02K 9/974 |
| | | | | 244/171.3 |
| 11,708,517 | B1 * | 7/2023 | Onaizi | C09K 8/16 |
| | | | | 166/304 |
| 11,746,278 | B1 * | 9/2023 | Onaizi | C09K 8/532 |
| | | | | 166/304 |
| 12,144,823 | B2 * | 11/2024 | Jermy | A61P 35/00 |
| 12,269,934 | B2 * | 4/2025 | Prevoir | C08K 3/346 |
| 2008/0248201 | A1 * | 10/2008 | Corkery | C09D 7/62 |
| | | | | 427/256 |
| 2008/0249221 | A1 * | 10/2008 | Corkery | C09J 11/04 |
| | | | | 524/404 |
| 2009/0326133 | A1 * | 12/2009 | Daly | C08K 3/346 |
| | | | | 252/601 |
| 2011/0183146 | A1 * | 7/2011 | Wendell, Jr. | C03C 17/30 |
| | | | | 428/429 |
| 2012/0189808 | A1 * | 7/2012 | Wendell | B32B 9/045 |
| | | | | 977/762 |
| 2017/0072604 | A1 * | 3/2017 | Sjong | B29C 44/3469 |
| 2018/0277811 | A1 * | 9/2018 | Liu | H01M 50/403 |
| 2018/0345247 | A1 * | 12/2018 | Akbari | B01J 20/28007 |
| 2020/0002030 | A1 | 1/2020 | Brendel et al. | |
| 2023/0358741 | A1 * | 11/2023 | Xu | G01N 33/56911 |
| 2024/0117180 | A1 * | 4/2024 | Benfatti | C08L 67/02 |

OTHER PUBLICATIONS

Pasbakhsh, Pooria, et al. "EPDM/modified halloysite nanocomposites." Applied Clay Science 48.3 (Feb. 1, 2010): 405-413. (Year: 2010).*

Yuan, Peng, Daoyong Tan, and FaÃ¯za Annabi-Bergaya. "Properties and applications of halloysite nanotubes: recent research advances and future prospects." Applied Clay Science 112 (May 25, 2015): 75-93. (Year: 2015).*

Berahman, Reyhaneh, et al. "Preparation and characterization of vulcanized silicone rubber/halloysite nanotube nanocomposites: Effect of matrix hardness and HNT content." Materials & Design 104 (May 6, 2016): 333-345. (Year: 2016).*

Karami, Zohre, et al. "Well-cured silicone/halloysite nanotubes nanocomposite coatings." Progress in Organic Coatings 129 (Feb. 1, 2019): 357-365. (Year: 2019).*

Hayeemasae, Nabil, et al. "Viable properties of natural rubber/halloysite nanotubes composites affected by various silanes." Polymers 15.1 (Dec. 21, 2022): 29. (Year: 2022).*

Uner, Gizem, Gulderen Karakus, and Hatice Kaplan Can. "Design, fabrication and characterization of silane tailored surface of halloysite based polymer nanocomposites." Polymer Composites 44.2 (Nov. 28, 2022): 1305-1330. (Year: 2022).*

Hu, Yongwei, et al. "Progress in application of silane coupling agent for clay modification to flame retardant polymer." Molecules 29.17 (Aug. 31, 2024): 4143. (Year: 2024).*

Zielecka, Maria, and Anna Rabajczyk. "Silicone Nanocomposites with Enhanced Thermal Resistance: A Short Review." Materials 17.9 (Apr. 25, 2024): 2016. (Year: 2024).*

Christian Gogu, Satish K. Bapanapalli, Raphael T. Haftka, and Bhavani V. Sankar, "Comparison of Materials for an Integrated Thermal Protection System for Spacecraft Reentry" Journal of Spacecraft and Rockets, vol. 46, No. 3, May-Jun. 2009.

Greene, Effie E., "Thermal Protection and Control" Flight Structures & Thermal Protection Systems Branch, Kennedy Space Center, University of Nebraska-Lincoln, Summer 2013.

* cited by examiner

100 —

106 — 102

104 —

104 —

102

102

202 —

208

204

206

210

METHOD OF PRODUCING AN ALUMINOSILICATE REINFORCED SILICONE SYNTACTIC THERMAL PROTECTION SYSTEM

BACKGROUND

A thermal protection system is needed to protect a spacecraft from extreme temperatures arising during launch, atmospheric reentry and descent. Generally installed external to a spacecraft, primary design factors of a thermal protection system are weight and cost while ensuring protection of the spacecraft.

A thermal protection system inhibits the conduction of heat to the interior of the spacecraft. For example, a thermal protection system may include various materials applied externally to the outer structural skin of the spacecraft to maintain acceptable temperatures during reentry and other phases of flight. Materials used for a thermal protection system, whether ablative or reusable, are generally selected for their high-temperature stability and weight efficiency. There continues to be a demand for improvement in design and materials for thermal protection for space flight missions.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
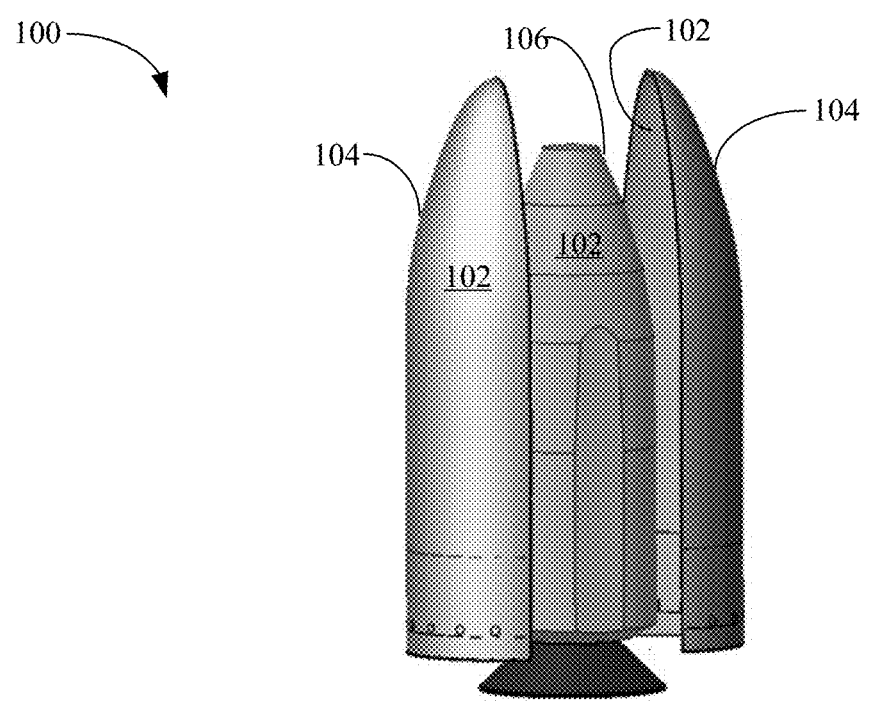
FIG. 1 illustrates a spacecraft that includes a thermal protection system on fairings and a payload module, according to some embodiments.

This disclosure describes a number of techniques and materials for producing and providing a thermal protection system (TPS) for a spacecraft. In particular, a TPS may comprise a syntactic foam that, as a spray-on foam insulation (SOFI), may be sprayed or rolled onto a tank surface, payload module, fairings, or other parts of a spacecraft. Syntactic foams may also be applied as preformed panels that are adhered or mechanically attached to a surface.

A syntactic foam is a composite material that may comprise microspheres dispersed in a matrix material. Generally, the matrix material may be a metal or polymer. The inclusion of microspheres, which may be hollow, generally results in a thermal (and sound) insulator having a relatively low density, high specific strength (e.g., strength divided by density), and a low coefficient of thermal expansion.

In various embodiments, performance of syntactic foams may be improved for use as a TPS by including an aluminosilicate nanotube material, such as halloysite nanotubes (HNTs), in a matrix material. In particular, HNTs may be hydrated and treated with a silane couplant before being mixed into the matrix material, which may be a two-part silicone based syntactic insulator material, for example. Such a combination of HNTs and a syntactic insulator material is herein called an HNT-modified syntactic TPS. This combination involves HNTs acting as a filler and reinforcement for the syntactic insulator material. Moreover, the HNTs are modified to bond to the silicone of the syntactic insulator material and are also hydrated, which leads to release of water upon heat exposure. In some implementations, HNTs may also be combined and interspersed in the syntactic insulator material with microspheres.

HNTs are a natural product that may be mined from the earth and occur naturally in nanotube form configured as sheets of rolled scrolls. The rolled scrolls may be hydrated, and upon exposure to sufficient heat the scrolls may act as a flame retardant and have a cooling affect by releasing water previously trapped within the nanotubes. As described below in more detail, the outer surface is predominantly $SiO_2$ and the inner surface is predominantly $Al_2O_3$.

In some embodiments, as mentioned above, a TPS may comprise a syntactic foam that includes a silicone-based matrix material and hydrated HNTs dispersed in the silicone-based matrix material. The hydrated HNTs may be treated to increase the surface energy thereof. Such treatment may involve a silanization process to increase the adherability between the hydrated HNTs and the syntactic foam. Resultantly, the hydrated HNTs may be at least partially coupled to silane. In some implementations, the silane may comprise, at least in part, 3-aminopropyltrimethoxysilane. Other types and forms of silane may also be used.

As described below, the syntactic foam may further include microspheres dispersed among the hydrated HNTs. The concentration of the hydrated HNTs in the syntactic foam may be in a range from about 5% to 40% by mass. The syntactic foam, with the inclusion of the hydrated HNTs, may be ablative and may release water during ablation. In some implementations, as described below, a honeycomb or grid core may be attached to a surface of a spacecraft (or any other surface), where the syntactic foam may be packed in the honeycomb or grid structure.

In some embodiments, to produce HNT-modified syntactic TPS, a method may include hydrating HNTs to form hydrated HNTs and treating the hydrated HNTs to increase their adherability to a silicone-based matrix material. The method may further include combining the silicone-based matrix material and the treated HNTs to form a syntactic foam. In some implementations, microspheres may be added to the syntactic foam.

The hydrated HNTs may be treated to increase their adherability by increasing their surface energy. Increasing their adherability may further include applying silane to the hydrated HNT. Also, treating the hydrated HNTs to increase their adherability may include silanizing the hydrated HNTs to allow formation of strong bonds (e.g., chemical bonds) between the hydrated HNTs and the syntactic foam. For example, silane-bearing coupling agents, such as but not limited to, N-(2-Aminoethyl)-3-aminopropyltrimethoxysilane may be used to activate the $SiO_2$ surface of the HNTs to increase surface energy and strength of chemical bonding to the silicone matrix.

In some implementations, the HNT-modified syntactic TPS may be formed into panels or sheets, which can be attached to an exterior surface of a vehicle, such as a spacecraft. In other implementations, the HNT-modified syntactic TPS may be sprayed or rolled onto a surface. For example, a honeycomb or grid core that is attached to a surface of a spacecraft may be packed and filled with the HNT-modified syntactic TPS.

An HNT-modified syntactic TPS may provide a number of benefits, such as an improved ability to withstand high temperatures without excessive degradation of material properties, relatively high thermal resistance, improved mechanical performance (e.g., compressive and shear strength, impact resistance, bending resilience, and so on), resistance to oxidation, and being lightweight. Further benefits are gained by various properties of HNTs. For example, HNTs are a natural material and are an environmentally friendly reinforcement material. The chemical structure of the rolled scroll-like nanotube of an HNT is an outer surface of $SiO_2$ and an inner surface of $Al_2O_3$. The $SiO_2$ outer surface forms a surface which is conducive to bonding to the silicone matrix of the syntactic foam. The $SiO_2$ outer surface can also be treated with a silane coupling agent to increase surface energy and make the surface more conducive to silicone adhesion, as described below. The $Al_2O_3$ provides heat resistance and is a refractory material. For example, HNTs are heat resistant and have a melting point which is near that of pure Alumina ($Al_2O_3$). HNTs occur in a hydrated and non-hydrated form. The hydrated form has water molecules that are trapped inside the scroll-like sheet. Upon heat application or ablation, the release of this water can cool the surrounding thermal protection system by evaporative ablation of the HNT material in the matrix.

FIG. 1 illustrates a spacecraft 100 that includes a thermal protection system 102 on fairings 104 and on a payload module 106, according to some embodiments. Spacecraft 102 is presented as an example of the types of structures or vehicles, particularly in the aerospace field, that may use an HNT-modified syntactic TPS. In some implementations, the TPS may act as an outer layer attached to a metal skin, such as aluminum or titanium, or to a polymeric skin, such as fiber reinforced composite (FRC) materials. The HNT-modified syntactic TPS may be sprayed onto the surfaces of fairings 104 and payload module 106. In other embodiments, the HNT-modified syntactic TPS may be pre-formed panels that are attached onto surfaces of the fairings and payload module.

Figure 2:
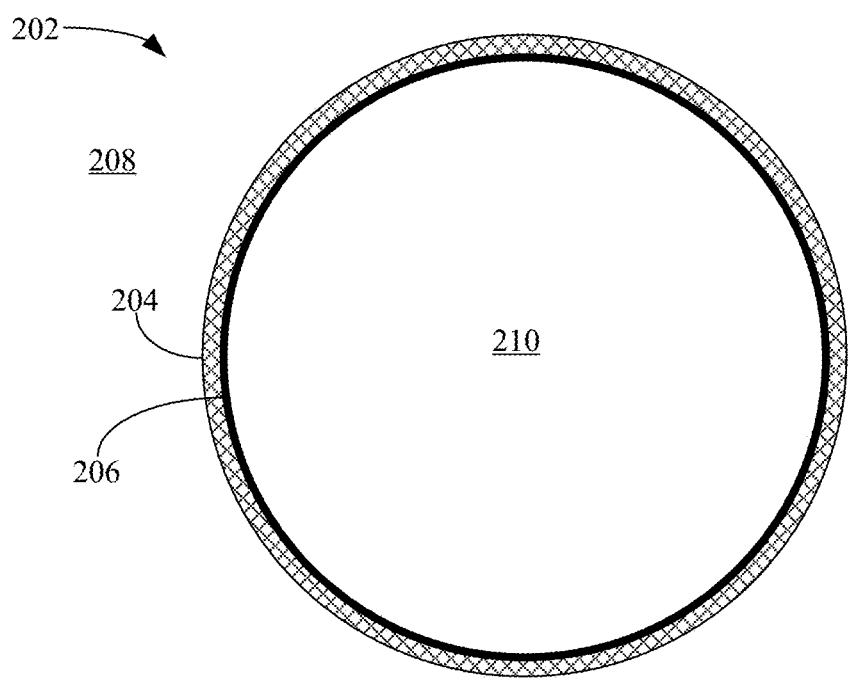
FIG. 2 is a cross-section of a tank or other portion of a spacecraft covered with a thermal protection system, according to some embodiments.

FIG. 2 is a cross-section of a tank or other portion 202 of a spacecraft covered with a thermal protection system 204, which is an HNT-modified syntactic TPS, according to some embodiments. For example, spacecraft portion 202 may be a cryogenic tank (e.g., as part of a spacecraft) to store liquid hydrogen or liquid oxygen. The circular cross-section may be representative of a spherical or cylindrical tank. Though a tank is used in this example, HNT-modified syntactic TPS may be applied onto the surface of other things, such as other parts of a space vehicle. Claimed subject matter is not limited to the things onto which the HNT-modified syntactic TPS is applied. Spacecraft portion 202 includes a metallic shell 206. The exterior surface of HNT-modified syntactic TPS 204 is exposed to outside 208 of spacecraft portion 202 and the interior surface is exposed to contents 210. In an implementation, such as during a reentry phase of a space flight mission, outside 208 may comprise high speed air impinging on HNT-modified syntactic TPS 204, leading to relatively high temperatures at this interface.

In some embodiments, HNT-modified syntactic TPS 204 may be applied onto metallic tank shell 206 by a spray process, wherein the TPS material is stored and sprayed in a fluid state until it hardens on the metallic tank shell. In other embodiments, a honeycomb or grid core may be attached to metallic shell 206, and the HNT-modified syntactic TPS 204 may be packed in the honeycomb or grid structure. In still other embodiments, HNT-modified syntactic TPS 204 may comprise a number of pre-formed panels that are attached onto metallic tank shell 206.

Figure 3:
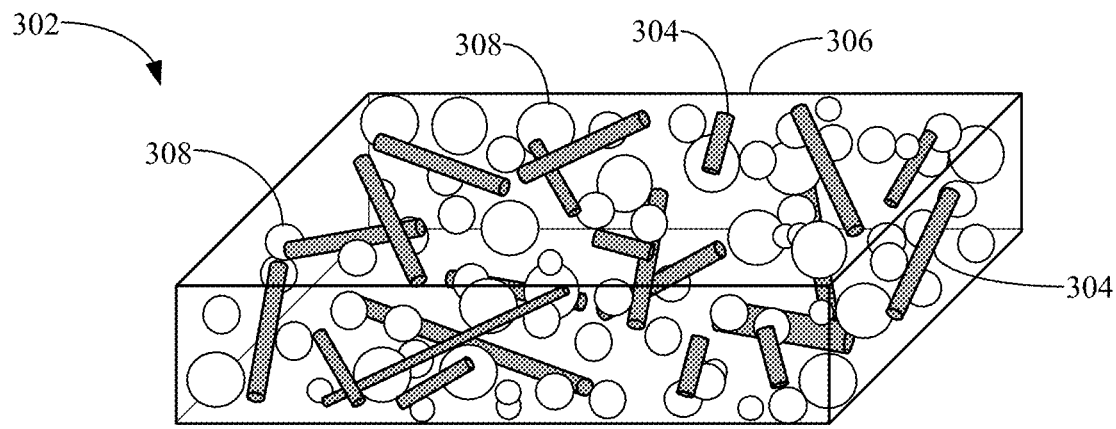
FIG. 3 is a schematic perspective view of a syntactic foam that includes hydrated halloysite nanotubes, according to some embodiments.

FIG. 3 is a close-up schematic perspective view of an HNT-modified syntactic TPS 302 that includes hydrated HNTs 304, according to some embodiments. HNT-modified syntactic TPS 302 comprises a matrix material 306 that includes microspheres 308 dispersed therein. As illustrated, microspheres 308 need not all have identical sizes, as described below. Matrix material 306 may be a polymer such as a thermoplastic (e.g., polyethylene, polypropylene, polystyrene, some polyimides or polyamides) or thermosetting plastic (e.g., epoxy resin, phenolic resin, polyimides, cyanate esters, or polyurethanes). In other embodiments, matrix material 306 may be a metal such as aluminum, magnesium, or titanium, among other metals. In yet other embodiments, matrix material 306 may be a ceramic such as carbon, zirconia, silicon carbide, silicon nitride, and so on.

In a syntactic foam, the matrix material may provide most of its tensile strength. Addition of hydrated HNTs 304 may increase the tensile strength. In some implementations, hydrated HNTs 304 may be treated with a silanization process to allow the formation of strong bonds (e.g., chemical bonds) between the hydrated HNTs and matrix material 306. For example, hydrated HNTs 304 may be silanized to increase their surface energy for bonding and wet-out.

In some example embodiments, hydrated HNT concentration in TPS material (e.g., matrix material 306) may range from about 5 to 40% by mass. A nominal formulation may contain about 33% by mass. Nominal nanotube diameter may be in a range of about 30-70 nanometers and their lengths may be in a range of about 1-3 microns, though claimed subject matter is not limited to such example dimensions.

Microspheres 308 may be evenly or non-evenly distributed in the matrix material. Microspheres 308 may comprise glass, cenospheres (e.g., hollow spheres made largely of silica and alumina), carbon, or polymers, just to name a few examples. Microspheres 308 may generally be distributed throughout matrix material 306 and have a relatively low thermal conductivity. Thus, when microspheres 308 are distributed in the matrix material, the overall thermal conductivity of the syntactic foam is lower than the thermal conductivity of the matrix material. In these implementations, the thermal conductivity of the microspheres is less than that of the matrix material. Microspheres 308, which may be hollow or solid, may have varying degrees of size and/or distribution in matrix material 306. For example, for various implementations, microsphere diameters may be in a range from several nanometers to hundreds of microns. In another example, microsphere concentration in a matrix material may be in a range from less than 1% to about 75% of the total foam volume.

Figure 4:
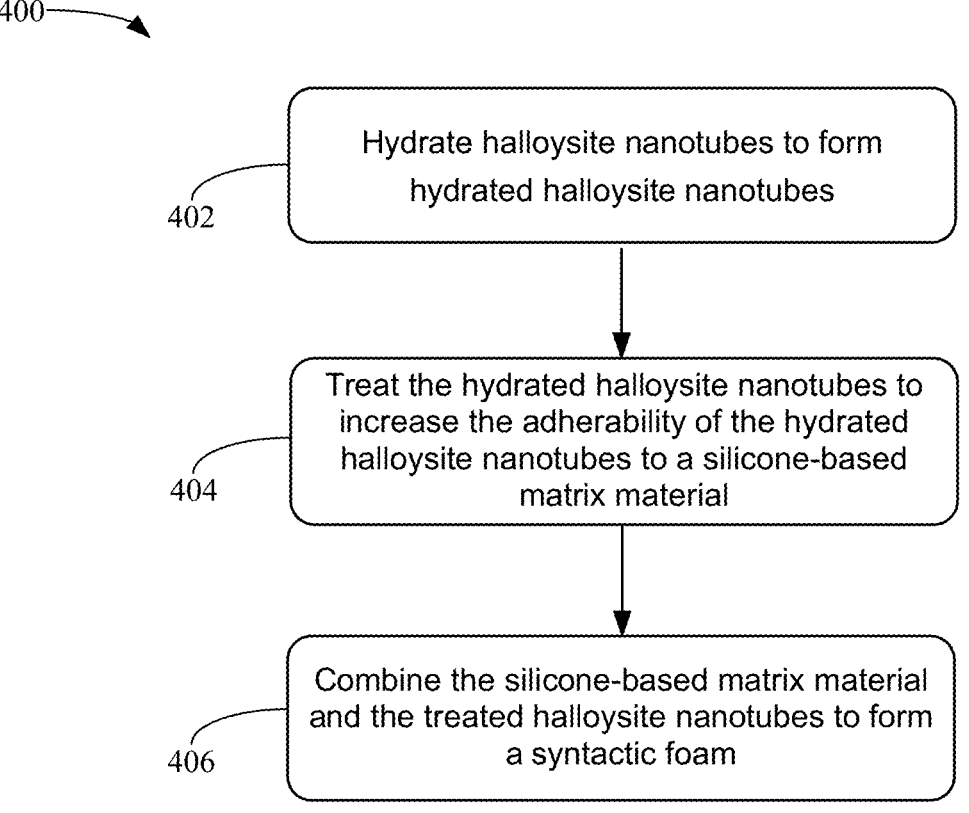
FIG. 4 is a flow diagram of a process for producing a thermal protection system, according to some embodiments.

FIG. 4 is a flow diagram of a process 400 for producing an HNT-modified syntactic TPS, according to some embodiments. Process 400 may be performed by a fabricator, for example. Fabrication of an HNT-modified syntactic TPS involves combining a matrix material, hydrated HNTs, and, in some implementations, hollow particles (e.g., microspheres). Additional materials may be introduced in some cases. The hollow particles may be engineered hollow particles or fly-ash cenospheres, for instance. The selection of particular materials may be based on their mechanical and thermal properties, compatibility with the matrix alloy, and cost, just to name a few examples.

At 402, a fabricator may hydrate HNTs to form hydrated HNTs. For example, HNTs may be hydrated by a soak in water and subsequent drying, such as in a desiccator, to remove excess water. In another example, HNTs may be hydrated by exposure to non-condensing water vapor like steam.

At 404, the fabricator may treat the hydrated HNTs to increase their adherability to a syntactic foam that is a silicone-based matrix material. For example, the hydrated HNTs may be sifted and combined with a silane couplant as the hydrated HNTs fall out of the sifter and through the air (or other medium). Such combining may be performed by spraying the silane couplant. In another example, the hydrated HNTs may be soaked in the silane couplant.

At 406, the fabricator may combine the silicone-based matrix material and the treated HNTs to form the HNT-modified syntactic TPS. In some implementations, the silicone-based matrix material, in the case of nonmetallic matrix materials (e.g., epoxies), may begin in a liquid state and be subsequently placed into a plastic state by adding a catalyst to the silicone-based matrix material. After a curing time, the silicone-based matrix material will solidify from the plastic state to a rigid state. At this stage, for example, the rigid silicone-based matrix material may be formed into panels.

In some embodiments, fabrication of rigid silicone-based matrix materials may involve blending of a filler (e.g., hydrated HNTs) and binder, filling a mold-cavity with the blended mixture, and implementing a cure process and post treatment. For example, in one particular embodiment, a silicone-based matrix material may be produced by a vacuum-assisted mold filling technique, wherein a cavity is filled with microspheres, after which a binder is added under an applied vacuum to avoid creation of void spaces within the resulting matrix composite. Thereafter, the matrix composite is allowed to cure before post treatment. Process details may depend, at least in part, on filler and matrix type, binder type, cavity/mold formation, mixing and curing time, and post curing treatment, for example. In a particular example of sprayable silicone-based matrix materials, a liquid polymeric resin and hollow microspheres may be sprayed using separate adjustable streams such that both are mixed in the air just before reaching a destination surface, entering a mold, or entering a honeycomb or grid core attached to a surface. In implementations described herein, hydrated HNTs may be included in the liquid polymeric resin stream. In other implementations, hydrated HNTs may be included in the hollow microspheres stream.

In some embodiments, an HNT-modified syntactic TPS may be part of a larger thermal protection system that is applied to a vehicle, such as a spacecraft. For example, the HNT-modified syntactic TPS may be formed into panels or sheets that are mechanically attached or adhered to the surface of a vehicle. In another example, the HNT-modified syntactic TPS may be sprayed onto the surface of a vehicle. In some implementations, the surface may include a honeycomb or grid core attached thereon. In still another example, the HNT-modified syntactic TPS may be packed into a honeycomb or grid core that is attached to a surface of a vehicle.

Figures 5, 6, 7:
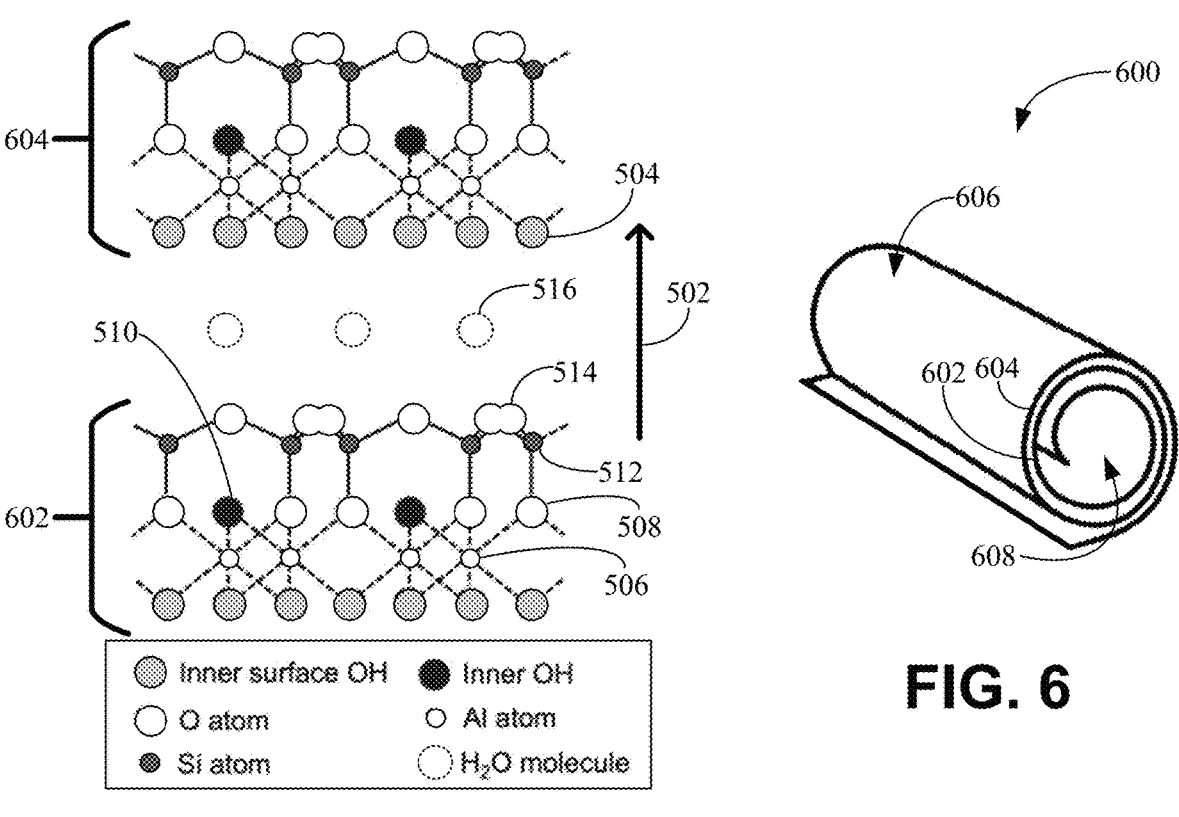
FIG. 5 illustrates a chemical structure of hydrated halloysite nanotubes, according to some embodiments.
FIG. 6 is a perspective representation of a hydrated halloysite nanotube, according to some embodiments.
FIG. 7 illustrates a chemical structure of silanated hydrated halloysite nanotubes, according to some embodiments.

FIG. 5 illustrates a general chemical structure of HNTs and FIG. 6 is a perspective representation of a hydrated HNT 600, according to some embodiments. In particular, the chemical structures of a first concentric layer 602 and an adjacent second concentric layer 604 are illustrated in FIG. 5. These concentric layers are part of hydrated HNT 600 and generally repeated for each successive layer of the nanotube roll. Arrow 502 indicates a direction from inside to outside the nanotube. The outer surface 606 (which is the outer part of second concentric layer 604) of HNT 600 may be an external siloxane surface comprising a chain or matrix of $SiO_2$. The inner surface 608 (which is the inner part of first concentric layer 602 in the case of a nanotube roll of only two layers) of HNT 600 may be an internal alumina surface comprising Al—OH groups.

Both first and second concentric layers 602 and 604 include OH groups 504 on an inner surface (e.g., relative to the nanotube), which are bonded to oxygen atoms 506. Further toward the outer surface, a layer of oxygen atoms 508 and OH groups 510 underlie silicon 512 and oxygen atoms 514 (e.g., $SiO_2$). Water molecules ($H_2O$) 516 are between first and second concentric layers 602 and 604 of hydrated HNT. This is the water that is released during ablation of the HNT-modified syntactic TPS, as mentioned above.

FIG. 7 schematically illustrates a portion of second concentric layer 604 to describe a general chemical structure of silanated hydrated HNTs, according to some embodiments. The illustration, which includes an alumina inner surface 702 and outer siloxane surface 606, is not necessarily to scale. As mentioned above, hydrated HNTs may be treated to increase their adherability to a syntactic foam. Such an increase may be realized by increasing the surface energy of the hydrated HNTs by silanizing the hydrated HNTs to allow formation of strong bonds (e.g., chemical bonds) between the hydrated HNTs and the syntactic foam. This process may involve silane comprising, at least in part, 3-aminopropyltrimethoxysilane, though other silane formulations may be used and claimed subject matter is not limited in this respect.

FIG. 7 illustrates a silane group R—Si—O, where R represents the organic group portion of the silane molecule. Referring to hydrated HNT 600 as an example, R—Si—O bonds to outer surface 606, which includes silicon atoms 512 and oxygen atoms 514. The silane group includes a silicon atom 704 that forms a bond between the silane group and the external silicon surface (e.g., 606) of the HNT.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

I claim as follows:

1. A method of producing a thermal protection system, the method comprising:

hydrating halloysite nanotubes to form hydrated halloysite nanotubes that contain water molecules trapped within scroll-like sheets, wherein the water molecules are between concentric layers of the scroll-like sheets and wherein hydrating the halloysite nanotubes comprises at least one of (i) soaking the halloysite nanotubes in water and subsequently drying to remove excess water, or (ii) exposing the halloysite nanotubes to non-condensing water vapor;

treating the hydrated halloysite nanotubes with a silane coupling agent to increase surface energy and to enable formation of strong chemical bonds between the hydrated halloysite nanotubes and a silicone-based matrix material; and combining the silicone-based matrix material and the treated hydrated halloysite nanotubes to form a syntactic foam, wherein the hydrated halloysite nanotubes release water upon ablation to provide evaporative cooling, and wherein the syntactic foam is adapted for use in a thermal protection system to withstand high-temperature thermal cycling and ablation.

2. The method of claim 1, wherein treating the hydrated halloysite nanotubes to increase the adherability comprises increasing surface energy of the hydrated halloysite nanotubes.

3. The method of claim 1, wherein treating the hydrated halloysite nanotubes to increase the adherability comprises applying silane to the hydrated halloysite nanotubes.

4. The method of claim 3, wherein the silane comprises, at least in part, 3-aminopropyltrimethoxysilane.

5. The method of claim 1, wherein treating the hydrated halloysite nanotubes to increase the adherability comprises silanizing the hydrated halloysite nanotubes to allow formation of chemical bonds between the hydrated halloysite nanotubes and the syntactic foam.

6. The method of claim 1, further comprising adding microspheres to the syntactic foam.

7. The method of claim 1, further comprising forming the syntactic foam into panels or sheets.

8. The method of claim 1, further comprising spraying the syntactic foam onto a surface.

9. The method of claim 1, further comprising packing the syntactic foam into a honeycomb or grid core that is attached to a surface.

10. The method of claim 1, wherein a concentration of the hydrated halloysite nanotubes in the syntactic foam is in a range from about 5% to 40% by mass.

11. A method of producing a thermal protection system, the method comprising:

hydrating halloysite nanotubes to form hydrated halloysite nanotubes that contain water molecules trapped within scroll-like sheets, wherein the water molecules are between concentric layers of the scroll-like sheets and wherein hydrating the halloysite nanotubes comprises at least one of (i) soaking the halloysite nanotubes in water and subsequently drying to remove excess water, or (ii) exposing the halloysite nanotubes to non-condensing water vapor;

applying a silane coupling agent to the hydrated halloysite nanotubes to produce silanated hydrated halloysite nanotubes that are configured to chemically bond to a silicone-based matrix material;

combining the silanated hydrated halloysite nanotubes with the silicone-based matrix material to form a syntactic foam; and arranging the syntactic foam into the thermal protection system, wherein the syntactic foam resists degradation by thermal cycling and ablation and provides cooling by release of water from the hydrated halloysite nanotubes.

12. The method of claim 11, wherein applying the silane to the hydrated halloysite nanotubes increases surface energy of the hydrated halloysite nanotubes.

13. The method of claim 11, wherein the silane comprises, at least in part, 3-aminopropyltrimethoxysilane.

14. The method of claim 11, wherein combining the silanated hydrated halloysite nanotubes with the silicone-based matrix material further comprises forming chemical bonds between the silanated hydrated halloysite nanotubes and the syntactic foam.

15. The method of claim 11, further comprising adding microspheres to the syntactic foam.

16. The method of claim 11, wherein arranging the syntactic foam into the thermal protection system further comprises forming the syntactic foam into panels or sheets.

17. The method of claim 11, wherein arranging the syntactic foam into the thermal protection system further comprises spraying the syntactic foam onto a surface.

18. The method of claim 17, wherein the surface includes a honeycomb or grid core that is attached to the surface.

19. The method of claim 11, wherein arranging the syntactic foam into the thermal protection system further comprises packing the syntactic foam into a honeycomb or grid core that is attached to a surface.

20. The method of claim 11, wherein a concentration of the hydrated halloysite nanotubes in the syntactic foam is in a range from about 5% to 40% by mass.

* * * * *